June 5, 1951 F. COHAN 2,556,029
PLASTIC SHUTTLECOCK
Filed March 7, 1946 2 Sheets-Sheet 1

INVENTOR:
FRANK COHAN
BY William Jehr
ATTORNEY

June 5, 1951 F. COHAN 2,556,029
PLASTIC SHUTTLECOCK
Filed March 7, 1946 2 Sheets-Sheet 2

INVENTOR:
FRANK COHAN
BY William Isler
ATTORNEY.

Patented June 5, 1951

2,556,029

UNITED STATES PATENT OFFICE 2,556,029

PLASTIC SHUTTLECOCK

Frank Cohan, Cleveland Heights, Ohio

Application March 7, 1946, Serial No. 652,617

1 Claim. (Cl. 273—106)

This invention relates, as indicated, to badminton shuttlecocks, but has reference more particularly to novel methods of fabricating or manufacturing such shuttlecocks from materials which are especially useful for this purpose, and to improvements in the design of such shuttlecocks.

It has heretofore been proposed to manufacture badminton shuttlecocks from plastic materials. Among United States patents disclosing the use of various plastic materials for this purpose are Patents Nos. 2,163,236; 2,192,180; 2,338,274; 2,354,790; and 2,359,726.

In most cases, however, the plastics or plastic materials employed are either too heavy or lack the resilience and other properties desired in such shuttlecocks, and in some cases, the plastics are difficult to mold in the thin sections necessary for manufacturing the shuttlecocks.

I have discovered, as the result of extensive experimentation, that the material known as nylon, the use of which has heretofore been confined chiefly to stockings, toothbrush bristles and wearing apparel, has the necessary lightness and resilience required for such shuttlecocks, and can be molded in the thin sections which are characteristic of such articles.

It is a primary object of the invention, therefore, to manufacture or fabricate badminton shuttlecocks from such material.

Another object of the invention is to manufacture or fabricate such shuttlecocks by methods involving novel and improved steps and details, whereby the shuttlecocks may be produced in commercially desirable quantities and at relatively low cost.

A further object of the invention is to provide shuttlecocks of improved construction and design.

A still further object of the invention is to provide shuttlecocks which have improved properties, and which are relatively long-lived.

Other objects and advantages of the invention will be apparent during the course of the following description.

In the accompanying drawings, forming a part of this specification, and in which like numerals are employed to designate like parts throughout the same:

Figure 1:
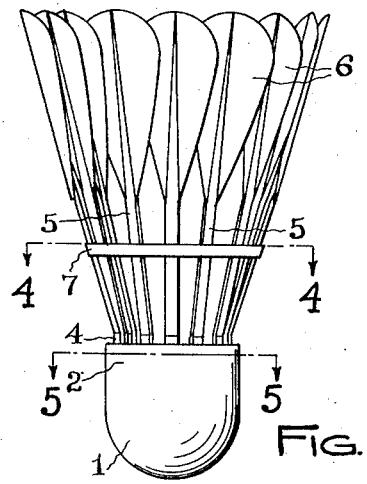
Fig. 1 is a side elevational view of a completed shuttlecock, constructed in accordance with a preferred method of assembling the parts.
Figure 2:
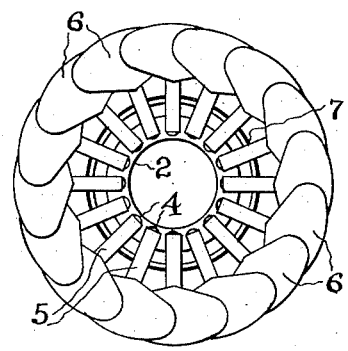
Fig. 2 is a top plan view of the shuttlecock.
Figure 3:
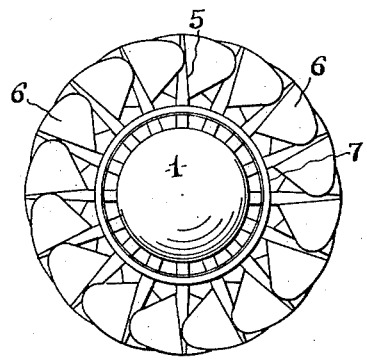
Fig. 3 is a bottom plan view of the shuttlecock.
Figure 4:
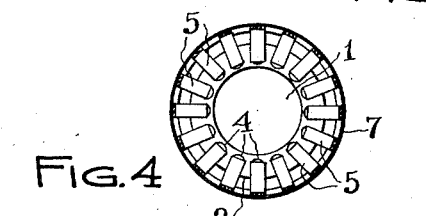
Fig. 4 is a cross-sectional view, taken on the line 4—4 of Fig. 1.
Figure 5:
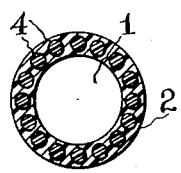
Fig. 5 is a cross-sectional view, taken on the line 5—5 of Fig. 1.
Figure 8:
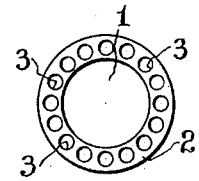
Fig. 8 is a top plan view of the body or head shown in Fig. 6.
Figures 6, 7:
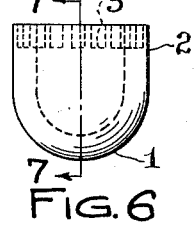
Fig. 6 is a side elevational view of the body or head of the shuttlecock shown in Fig. 1.
Fig. 7 is a cross-sectional view, taken on the line 7—7 of Fig. 6.
Figures 9, 10, 11:
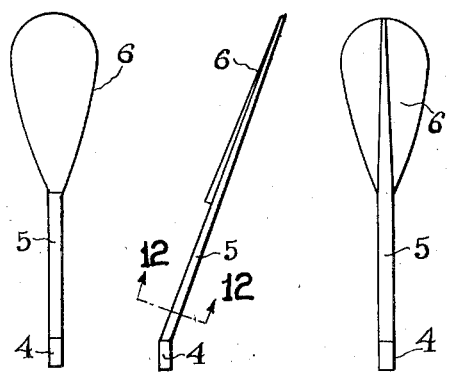
Fig. 9 is an elevational view of the inner face of one of the vanes or "feathers" of the shuttlecock.
Fig. 10 is an elevational view of the outer face of the vane.
Fig. 11 is a side elevational view of the vane, as viewed from the right side of Fig. 9.
Figure 12:
Fig. 12 is a cross-sectional view, on an enlarged scale, taken on the line 12—12 of Fig. 11.

Referring more particularly to Figs. 1 to 12 inclusive of the drawings, there is illustrated in Figs. 1, 2 and 3, a shuttlecock which consists of a multiplicity of parts, all or substantially all of which can be molded at the same time in a single mold, and then assembled to form the completed shuttlecock.

The shuttlecock, in this case, comprises a head or body having a nose portion 1 in the form of a hollow hemisphere and a portion 2 immediately above said nose portion in the form of a cylinder. The cylindrical portion 2 has formed in its upper end a multiplicity of circumferentially-spaced holes or recesses 3 which correspond in number to the number of vanes or "feathers" which are to be used in forming the shuttlecock.

The head or body, thus described, is preferably molded from the material known as nylon, by means of special methods and equipment which are necessary in molding nylon articles. By using this material, the weight of the head or body of the shuttlecock is reduced to a desired point, without sacrificing strength, and at the same time, other desired properties, such as resilience, good surface condition, and accuracy of detail are preserved.

The holes or recesses 3 are of relatively small diameter, and well adapted for the reception of the vanes or feathers to be now described.

The vanes or feathers are also molded from nylon, all of the vanes being molded at the same time, preferably by the aforesaid molding methods, and may be molded in the same mold in which the head or body is molded. Each of the vanes is molded in one piece in simulation of the natural feathers which are conventionally used in the manufacture of shuttlecocks, and each vane consists of a short base or shaft 4, which is adapted for insertion in one of the holes 3, a stem or rib 5 which extends angularly to the base 4 and tapers to a point at its upper end, and a thin blade 6 of substantially pear-shaped contour, which is supported by the upper tapering portion of the stem or rib 5 and projects from the inner side of the latter.

The stem or rib 5 preferably extends at an angle of about 21° to the base or shaft 4, so that when all of the vanes have been assembled with the body or head of the shuttlecock, the vanes are so disposed in relation to each other as to form a conical angle of about 42°, which is the conventional angle formed by the feathers of shuttlecocks.

Any suitable adhesive may be used for connecting the vanes to the head or body of the shuttlecock, but I prefer to effect the assembly by coating the shafts 4 of each vane with an adhesive especially adapted for use with nylon and then inserting the shafts into the recesses 2. This method of attaching the vanes to the head is effective to produce a virtually integral shuttlecock. In assembling the vanes with the head, it is necessary, of course, to have the blades 6 of the vanes overlap each other slightly at their edges, as do the feathers in a conventional shuttlecock construction, and this overlapping may be aided by means of suitable jigs or other devices for facilitating assembly.

After the vanes have been assembled with the head, an annular band 7, also formed or molded from nylon, is placed about the vanes and is permanently secured to the latter by means of the aforesaid special adhesive. This band maintains the vanes in properly assembled and overlapped relation.

By forming the vanes of nylon, they may be molded in a desired extremely thin section, the weight of the shuttlecock as a whole further reduced, and desired flight characteristics imparted to the shuttlecock. Moreover, the shuttlecocks can be produced rapidly and in commercially feasible quantities. The shuttlecocks are well adapted to withstand hard usage, and retain their shape and resilient properties for relatively long periods.

In that form of the invention shown in Figs. 13 to 20, inclusive, the shuttlecock is molded in a single piece, after which the vane-retaining band is connected to the vanes.

The body and vanes are molded in a single piece, from nylon, preferably by the aforesaid molding methods. The piece, as thus molded, consists of a head or body having a nose portion 1' in the form of a hollow hemisphere, a portion 2' immediately above said nose portion in the form of a cylinder, and a multiplicity of circumferentially-spaced vanes which extend upwardly and outwardly from the upper end of the cylinder 2', at an angle of about 48° to the axis of the cylinder, each of the vanes consisting of a stem or rib 5', which tapers to a point at its upper end, and a thin blade 6' of substantially pear-shaped contour, which is supported by the upper tapering portion of the stem or rib 5' and projects from the inner side of the latter.

Figure 13:
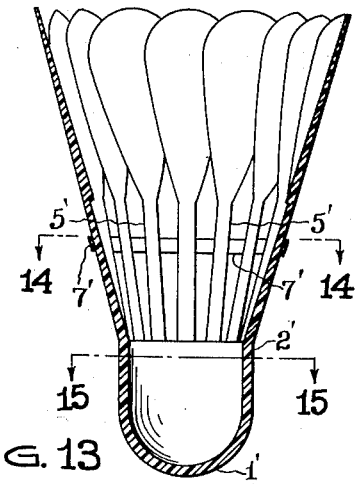
Fig. 13 is a view similar to Fig. 1, but showing a shuttlecock constructed in accordance with a modified method embodying the invention.
Figure 14:
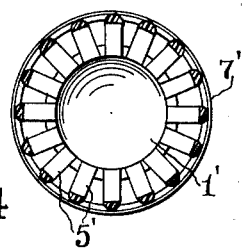
Fig. 14 is a cross-sectional view, taken on the line 14—14 of Fig. 13.
Figure 15:
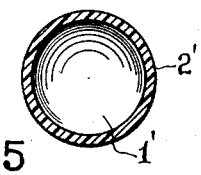
Fig. 15 is a cross-sectional view, taken on the line 15—15 of Fig. 13.
Figure 16:
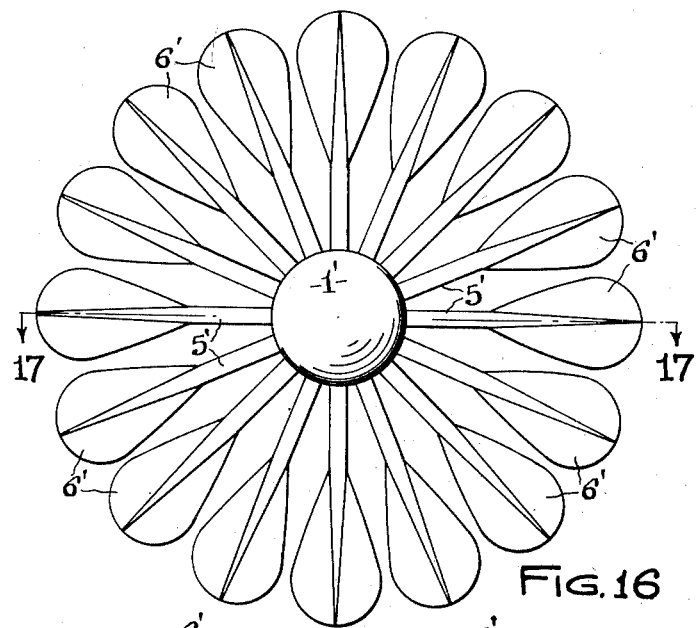
Fig. 16 is a bottom plan view of the shuttlecock of Fig. 13, as it appears when taken from the mold or die in which it is molded.
Figures 18, 19:
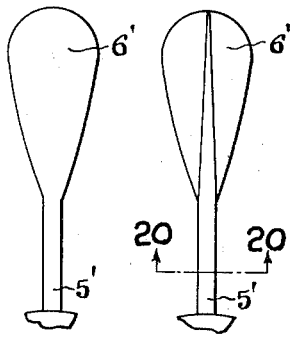
Fig. 18 is an elevational view of the inner face of one of the vanes of the shuttlecock of Fig. 13.
Fig. 19 is an elevational view of the outer face of the vane.
Figure 20:
Fig. 20 is a cross-sectional view, taken on the line 20—20 of Fig. 19.
Figure 17:
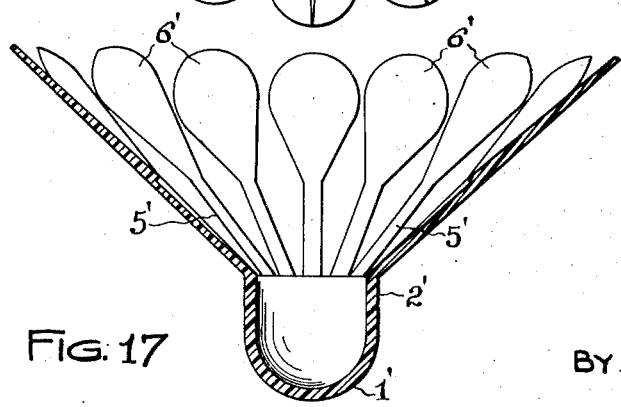
Fig. 17 is a cross-sectional view, taken on the line 17—17 of Fig. 16.

After the body and vanes have been molded in the foregoing manner, they are heated sufficiently to permit the vanes to be bent upwardly to form a conical angle of about 42°, with the blades 6' of the vanes in overlapping relationship to each other, as shown in Fig. 13. After the vanes have been thus positioned, an annular band 7', also formed from nylon, is placed about the vanes and is permanently secured to the latter by means of the aforesaid special adhesive.

The modified form of shuttlecock, as thus constructed, has all of the advantages of the preferred form of shuttlecock.

It is to be understood that the forms of my invention, herein described, are to be taken as preferred examples of the same, and that various changes may be resorted to without departing from the spirit of my invention, or the scope of the subjoined claim.

Having thus described my invention, I claim:

A badminton shuttlecock formed entirely from a plastic material and comprising a head in the form of a hollow hemisphere having a short cylindrical portion projecting therefrom, feathers extending angularly to the axis of said cylindrical portion and formed integrally therewith, each of said feathers comprising a stem portion and a generally pear-shaped end portion, the end portions of said feathers being in overlapping relation to each other, but being connected to each other above said cylindrical portion only by a narrow annular one-piece band which is spaced a substantial distance from said cylindrical portion of said head.

FRANK COHAN.

REFERENCES CITED

The following references are of record in the file of this patent:

UNITED STATES PATENTS

| Number | Name | Date |
| --- | --- | --- |
| 2,163,236 | Collier | June 20, 1939 |
| 2,212,079 | Saunders | Aug. 20, 1940 |
| 2,247,486 | Emerson | July 1, 1941 |
| 2,309,729 | Gordon | Feb. 2, 1943 |
| 2,338,274 | Yancey | Jan. 4, 1944 |
| 2,354,790 | Beck | Aug. 1, 1944 |
| 2,359,726 | Booty | Oct. 3, 1944 |